United States Patent
Ahmavaara

(10) Patent No.: US 9,197,706 B2
(45) Date of Patent: Nov. 24, 2015

(54) APPARATUS AND METHOD FOR BUNDLING APPLICATION SERVICES WITH INBUILT CONNECTIVITY MANAGEMENT

(75) Inventor: Kalle I. Ahmavaara, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 251 days.

(21) Appl. No.: 12/549,277

(22) Filed: Aug. 27, 2009

(65) Prior Publication Data

US 2010/0153228 A1  Jun. 17, 2010

Related U.S. Application Data

(60) Provisional application No. 61/138,103, filed on Dec. 16, 2008.

(51) Int. Cl.
| | |
|---|---|
| *G06Q 30/00* | (2012.01) |
| *G06F 17/30* | (2006.01) |
| *H04L 29/08* | (2006.01) |
| *G06Q 20/40* | (2012.01) |
| *G06Q 30/02* | (2012.01) |
| *G06Q 30/06* | (2012.01) |
| *H04L 12/14* | (2006.01) |

(52) U.S. Cl.
CPC .............. *H04L 67/14* (2013.01); *G06Q 20/40* (2013.01); *G06Q 30/0283* (2013.01); *G06Q 30/0601* (2013.01); *H04L 67/141* (2013.01); *H04L 12/14* (2013.01)

(58) Field of Classification Search
CPC ...................................................... H04L 67/14
USPC ................................................. 705/26.1–27.2
See application file for complete search history.

(56) References Cited

U.S. PATENT DOCUMENTS

| | | | |
|---|---|---|---|
| 5,774,869 A | 6/1998 | Toader |
| 5,987,611 A | 11/1999 | Freund |
| 6,473,768 B1 | 10/2002 | Srivastava et al. |
| 6,571,221 B1 | 5/2003 | Stewart et al. |
| 6,983,311 B1 | 1/2006 | Haitsuka et al. |
| 7,043,225 B1 | 5/2006 | Patel et al. |
| 7,089,194 B1 | 8/2006 | Berstis et al. |
| 7,130,807 B1 | 10/2006 | Mikurak |

(Continued)

FOREIGN PATENT DOCUMENTS

| | | |
|---|---|---|
| CN | 1567266 A | 1/2005 |
| CN | 101094225 A | 12/2007 |

(Continued)

OTHER PUBLICATIONS

Albright, P. (2002). GRIC targets enterprises with workplace applications. Wireless Week, 8(17), 29. Retrieved from http://search.proquest.com/docview/195505147?accountid=14753.*

(Continued)

*Primary Examiner* — Kathleen Palavecino
(74) *Attorney, Agent, or Firm* — Nerrie M. Zohn

(57) ABSTRACT

An apparatus and method for bundling application services with inbuilt connectivity management comprising launching a software application; detecting a need for connectivity to use the service associated with the software application; establishing connectivity; determining whether connectivity is established; and executing the service associated with the software application utilizing the established connectivity.

70 Claims, 8 Drawing Sheets

(56) References Cited

U.S. PATENT DOCUMENTS

| | | | |
|---|---|---|---|
| 7,382,879 B1 | 6/2008 | Miller | |
| 7,392,531 B2 | 6/2008 | Thurston et al. | |
| 7,433,311 B1 | 10/2008 | Kalyanasundaram et al. | |
| 7,437,449 B1 | 10/2008 | Monga et al. | |
| 7,580,701 B2 | 8/2009 | Ross et al. | |
| 7,821,984 B2 | 10/2010 | Wilson | |
| 8,693,358 B2 | 4/2014 | Hodges | |
| 8,831,517 B2 | 9/2014 | Shankaranarayanan | |
| 2002/0032609 A1 | 3/2002 | Wilkman | |
| 2002/0066033 A1 | 5/2002 | Dobbins et al. | |
| 2002/0095311 A1 | 7/2002 | Donahue | |
| 2002/0103879 A1 | 8/2002 | Mondragon | |
| 2002/0107697 A1 | 8/2002 | Jensen | |
| 2002/0147784 A1 | 10/2002 | Gold et al. | |
| 2003/0152039 A1 | 8/2003 | Roberts | |
| 2003/0177207 A1 | 9/2003 | Nagasaka et al. | |
| 2004/0030887 A1 | 2/2004 | Harrisville-Wolff et al. | |
| 2004/0083125 A1 | 4/2004 | Almeida et al. | |
| 2004/0225561 A1 | 11/2004 | Hertzberg et al. | |
| 2005/0060425 A1* | 3/2005 | Yeh et al. | 709/232 |
| 2005/0165646 A1 | 7/2005 | Tedesco et al. | |
| 2005/0177506 A1 | 8/2005 | Rissanen | |
| 2006/0206422 A1 | 9/2006 | Mashinsky | |
| 2006/0245414 A1 | 11/2006 | Susai et al. | |
| 2006/0259628 A1 | 11/2006 | Vadlapudi et al. | |
| 2007/0041536 A1 | 2/2007 | Koskinen et al. | |
| 2007/0072678 A1 | 3/2007 | Dagres | |
| 2007/0147318 A1 | 6/2007 | Ross et al. | |
| 2007/0150388 A1 | 6/2007 | Mendiratta et al. | |
| 2007/0180449 A1 | 8/2007 | Croft et al. | |
| 2007/0183400 A1 | 8/2007 | Bennett et al. | |
| 2007/0209061 A1 | 9/2007 | Dekeyzer et al. | |
| 2007/0282965 A1 | 12/2007 | Kataoka | |
| 2008/0071914 A1 | 3/2008 | Kimura et al. | |
| 2008/0240091 A1 | 10/2008 | Kesavan et al. | |
| 2008/0287096 A1 | 11/2008 | Aaltonen et al. | |
| 2008/0297481 A1 | 12/2008 | Higginson | |
| 2009/0234714 A1 | 9/2009 | Bolotin et al. | |
| 2010/0004959 A1 | 1/2010 | Weingrad | |
| 2010/0008337 A1 | 1/2010 | Bajko | |
| 2010/0042478 A1 | 2/2010 | Reisman | |
| 2010/0081461 A1* | 4/2010 | Bothra et al. | 455/466 |
| 2010/0100453 A1* | 4/2010 | Van Rensburg | 705/26 |
| 2010/0128667 A1* | 5/2010 | Russell | 370/328 |
| 2010/0177663 A1* | 7/2010 | Johansson et al. | 370/254 |
| 2010/0192207 A1 | 7/2010 | Raleigh | |
| 2010/0197268 A1 | 8/2010 | Raleigh | |
| 2010/0198698 A1 | 8/2010 | Raleigh et al. | |
| 2010/0205099 A1 | 8/2010 | Ahmavaara et al. | |
| 2010/0223096 A1 | 9/2010 | Bosan et al. | |
| 2010/0235233 A1 | 9/2010 | Goldberg et al. | |
| 2011/0178863 A1 | 7/2011 | Daigle | |
| 2012/0158829 A1 | 6/2012 | Ahmavaara et al. | |

FOREIGN PATENT DOCUMENTS

| | | |
|---|---|---|
| CN | 101184014 A | 5/2008 |
| CN | 101282336 A | 10/2008 |
| EP | 1043869 A2 | 10/2000 |
| EP | 1246445 A1 | 10/2002 |
| JP | 2000253070 A | 9/2000 |
| JP | 2000332750 A | 11/2000 |
| JP | 2001285337 A | 10/2001 |
| JP | 2003526273 A | 9/2003 |
| JP | 2004032423 A | 1/2004 |
| JP | 2004046420 A | 2/2004 |
| JP | 2005136627 A | 5/2005 |
| JP | 2006054841 A | 2/2006 |
| JP | 2006303751 A | 11/2006 |
| JP | 2007323115 A | 12/2007 |
| JP | 2008078878 A | 4/2008 |
| JP | 2010508738 A | 3/2010 |
| JP | 2013541278 A | 11/2013 |
| RU | 2297663 C2 | 4/2007 |
| WO | WO200117183 | 3/2001 |
| WO | 0167669 A2 | 9/2001 |
| WO | 03046742 A1 | 6/2003 |
| WO | 2005027387 A2 | 3/2005 |
| WO | 2008007039 A1 | 1/2008 |
| WO | 2008055541 A1 | 5/2008 |
| WO | 2008075154 A2 | 6/2008 |
| WO | 2012034080 A1 | 3/2012 |

OTHER PUBLICATIONS

International Preliminary Report on Patentability—PCT/US2009/067629, The International Bureau of WIPO—Geneva, Switzerland, Mar. 24, 2011.

International Search Report & Written Opinion—PCT/US2009/068327, International Search Authority—European Patent Office—Jun. 2, 2010.

Partial International Search Report—PCT/US09/068327—ISA/EPO—Apr. 10, 2010.

Taiwan Search Report—TW098143179—TIPO—Nov. 8, 2013.

* cited by examiner

APPARATUS AND METHOD FOR BUNDLING APPLICATION SERVICES WITH INBUILT CONNECTIVITY MANAGEMENT

CLAIM OF PRIORITY UNDER 35 U.S.C. §119

The present Application for Patent claims priority to Provisional Application No. 61/138,103 entitled "System and Methods to Facilitate Connections to Access Networks" filed Dec. 16, 2008, and assigned to the assignee hereof and hereby expressly incorporated by reference herein.

FIELD

This disclosure relates generally to apparatus and methods for connectivity management. More particularly, the disclosure relates to bundling application services with inbuilt connectivity management.

BACKGROUND

Wireless connections are used to provide flexible, mobile, and easily deployed connectivity between various user devices and communications infrastructure. Various types of services may be provided to users such as voice, data, multimedia, Internet access, video, messaging, etc. Typically, when a user connects a user device to a wireless communication system, the device uses a priori credentials and subscription data for wireless access. This information is often associated with a connectivity agreement between the wireless user and a service provider, which limits the wireless access to a particular communication system. The pre-determined connectivity agreement has the disadvantage of service inflexibility and static provisioning.

Alternatively, a wireless user could temporarily connect to a communication system provider by completing various forms and authorizing payment information to gain access to the service provider. This has the disadvantage of forcing the user to be actively involved in establishing temporary connectivity agreements. In addition, the user must trust the network service with its confidential payment information, e.g. credit card data.

In another example, a wireless device may have dedicated access to a particular website where a service provider pays for the access. However, if the user desires to use the device in a location which does not have network access provided by the service provider, then the service provider must arrange for such access with other service providers, for example, in another country. Thus, each of the current connectivity arrangements has disadvantages for the user in the form of inflexibility, not being able to gain access or having to give up confidential information for access.

SUMMARY

Disclosed is an apparatus and method for bundling application services with inbuilt connectivity management. According to one aspect, a method for bundling application services with inbuilt connectivity management comprising launching a software application; detecting a need for connectivity to use the service associated with the software application; establishing connectivity; determining whether connectivity is established; and executing the service associated with the software application utilizing the established connectivity.

According to one aspect, an access terminal for bundling application services with inbuilt connectivity management comprising a software application for detecting a need for connectivity to use the service associated with the software application; a processor for launching the software application; a communications component for establishing connectivity per directions from the software application and for determining whether connectivity is established; and wherein the processor executes the service associated with the software application utilizing the established connectivity.

According to one aspect, an apparatus for bundling application services with inbuilt connectivity management comprising means for launching a software application; means for detecting a need for connectivity to use the service associated with the software application; means for establishing connectivity; means for determining whether connectivity is established; and means for executing the service associated with the software application utilizing the established connectivity.

According to one aspect, a computer-readable medium storing a computer program, wherein execution of the computer program is for: launching a software application; detecting a need for connectivity to use the service associated with the software application; establishing connectivity; determining whether connectivity is established; and executing the service associated with the software application utilizing the established connectivity.

Advantages of the present disclosure include enabling handling of connectivity as a characteristic of a service or an application rather than as a characteristic of a device to provide access flexibility to a user. Additionally, connectivity can be sold in small chucks on a pay-as-needed basis, thus, enabling efficient modularization of a service business and a connectivity business.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
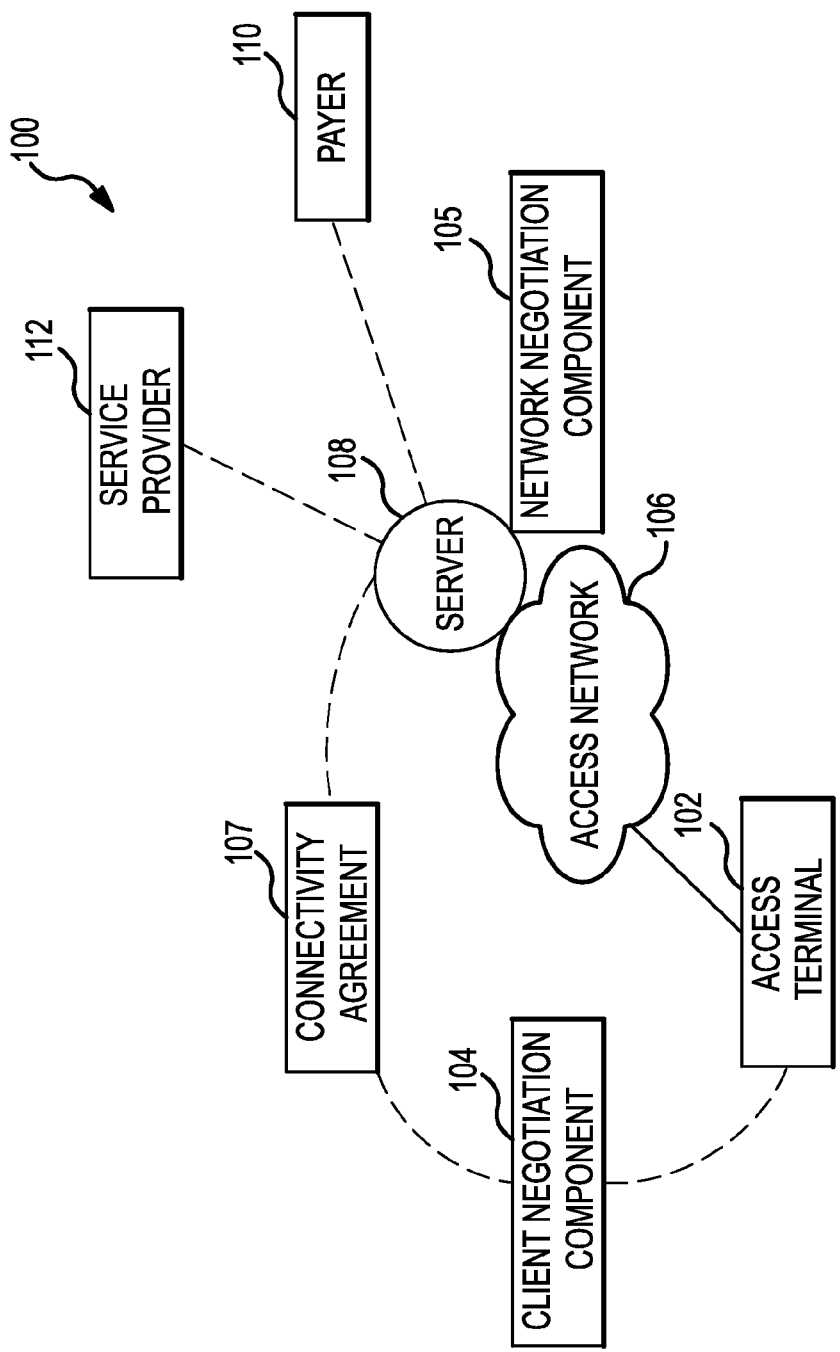
FIG. 1 illustrates an example wireless connectivity system that includes one or more access terminals and one or more access networks in accordance with one aspect of the present disclosure.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Current user applications are hosted on various user devices. In one example, user applications are implemented by a software program executed by a computing device with associated memory and input/output interfaces as part of the user device. The user device may be, for example, a laptop computer, a palm computer, a smart phone, a personal digital assistant (PDA), etc.

For example, the user application may require data exchange with a network which connects with other devices or systems. In one example, the network may be part of the Internet to enable global connectivity. The network connection may be arranged and paid for by the device user. However, in some cases, the users are unwilling to pay for network connectivity. In another example, users may not have the necessary skills or are unwilling to arrange and configure the network connectivity. The decoupling between the user application and network connectivity may make it difficult for service providers to provide user applications with ubiquitous connected convenience as the user applications may work only if the user device has network access. Current practice is that connectivity is always directly or indirectly associated with a device. Wireless communication systems have created service-specific devices, where the connectivity is tied to the device, creating unnecessary inflexibility for the user. Thus, there is a need to decouple connectivity from the device.

This present disclosure provides techniques which enable a new connected service experience. In the present disclosure, each enabled user application and/or service provider (sometimes also referred to as an application service provider (ASP)) can arrange connectivity for their network service on their own. With this solution, the required connectivity for the network service is no longer a specific characteristic of the user device where the user application is hosted, but is a characteristic of the user application or network service itself. In one aspect, the user device must still contain the physical capability for connectivity, for example, with a wireless modem. The present disclosure includes the capability of the application and service provider to communicate, detect, and purchase connectivity needs. It enables handling of connectivity as a characteristic of a service or an application, rather than as a characteristic of a device itself.

The techniques described herein may be used for various wireless communication systems with various access techniques such as, but not limited to, code division multiple access (CDMA), time division multiple access (TDMA), frequency division multiple access (FDMA), orthogonal frequency division multiple access (OFDMA), single carrier frequency division multiple access (SC-FDMA), etc. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM).

An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, e.g., 802.xx wireless local area network (WLAN), Bluetooth and any other short- or long-range, wireless communication techniques.

One skilled in the art would recognized that the examples of access techniques and wireless communication systems mentioned herein are examples and that other access techniques and wireless communication systems may be used without affecting the spirit or scope of the present disclosure. Additionally, various aspects or features will be presented in terms of the wireless communication systems that may include a number of devices, components, modules, and the like. It is to be understood and appreciated that the various wireless communication systems may include additional devices, components, modules, etc. and/or may not include all of the devices, components, modules etc. discussed in connection with the figures. A combination of these approaches may also be used.

In one aspect, applications which could be covered by the present disclosed connectivity management techniques include, but is not limited to, an Internet browser, Voice over Internet Protocol (VoIP) client, navigation software, gaming application, social network website, communications application, etc. User devices include, but are not limited to, cellular phone, smart phone, laptop computer, personal computer (PC), netbook, smartbook, mobile Internet device (MID), personal digital assistant (PDA), navigation device, gaming device, tracking device, infotainment system, etc.

FIG. 1 illustrates an example wireless communication system 100 that includes one or more access terminals 102 and one or more access networks 106 in accordance with one aspect of the present disclosure. In one example, the wireless communication system is referred to as a wireless connectivity system. Access terminal 102 may include any data or cellular user device that may connect to an access network 106. Access terminal 102 may be, for example, a wireless telephone, a navigation system, a computing device, a camera, a personal digital assistant (PDA), a music device, or a handheld device having wireless connection capability, among other devices discussed earlier. Further, access network 106 may provide various types of communication connection to access terminal 102, as discussed previously.

The wireless communication system 100 may include a client negotiation component 104 to negotiate connectivity with a corresponding network negotiation component 105 for access terminal 102 to access network 106. Note that the client negotiation component 104 may be situated anywhere within the communication system. For example, in one aspect, client negotiation component 104 is associated with access terminal 102. In another aspect, a service provider 112 may have negotiation component 104 to negotiate the connectivity of access terminal 102 to the access network 106. Service provider 112 may be any entity, such as a third party, which may have an interest in having access terminal 102 connect to access network 106. For example, service provider 112 may be a website. Client negotiation component 104 and negotiation network component 105 may generate a connectivity agreement 107 that defines connectivity parameters between access terminal 102 and access network 106. Such parameters may define connection characteristics such as data rate, error rate, availability, etc, as well as cost. In one aspect, the wireless communication system 100 includes a payer component 110. The Payer component 110 may be used to provide payments or promises-to-pay to server 108 corresponding to the cost of connectivity of access terminal 102 to access network 106. In one aspect, payment is made via a stored credit card number.

Figure 2:
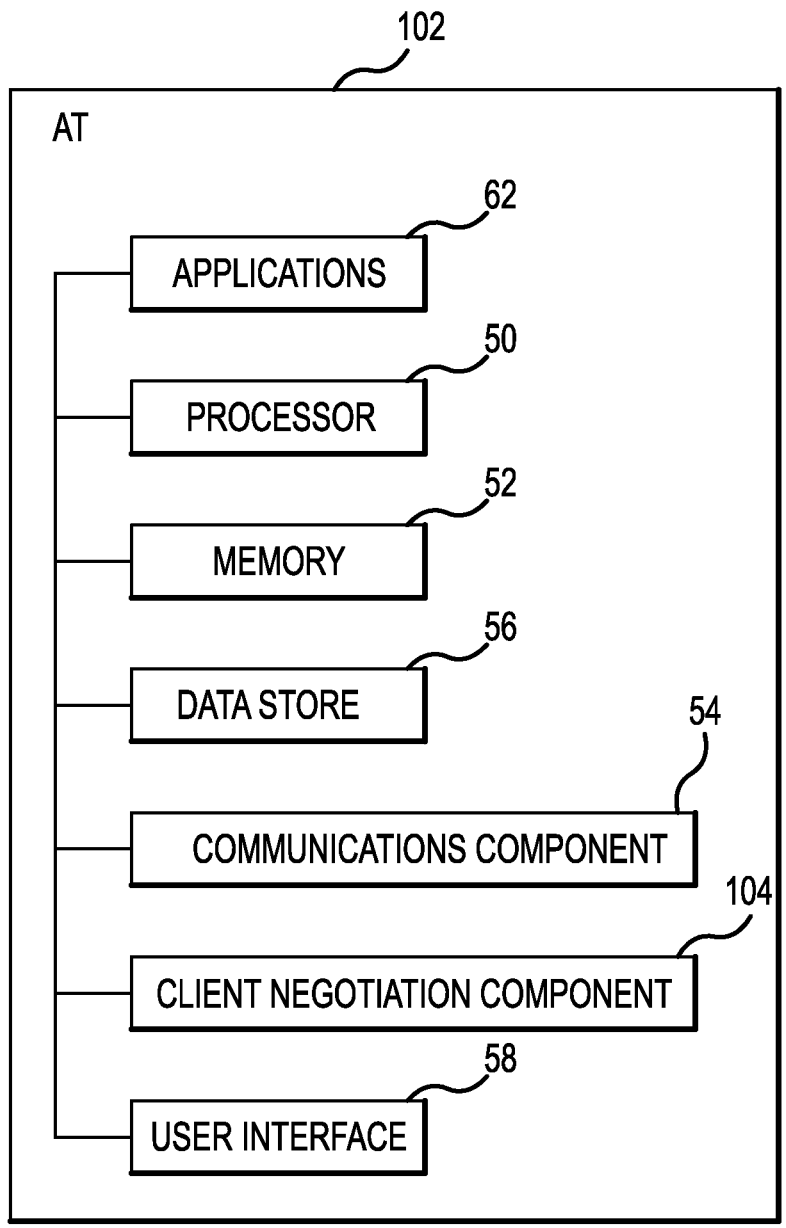
FIG. 2 illustrates an example access terminal in accordance with one aspect of the present disclosure.

FIG. 2 illustrates an example access terminal in accordance with one aspect of the present disclosure. In one aspect, the example access terminal is the access terminal 102 as shown in FIG. 1. The access terminal 102 provides a user with communication access to access network 106 (shown in FIG. 1), as well as with the other components of the wireless communication system 100 (shown in FIG. 1) to manage network connectivity. Access terminal 102 includes a mobile communication device operable on the wireless communication system. In one aspect, a variety of wireless communication systems may be used, which employ different spectral utilizations and/or different air interfaces. Examples of wireless communication systems include, without limitation, CDMA (CDMA 2000, EV DO, WCDMA), OFDM, or OFDMA (Flash-OFDM, 802.20, WiMAX, LTE), FDMA/TDMA (GSM) systems using frequency division duplex (FDD) or time division duplex (TDD) licensed spectrums, peer-to-peer (e.g., mobile-to-mobile) ad hoc network systems often using unpaired unlicensed spectrums, and 802.xx wireless LAN or Bluetooth techniques.

As illustrated in the example in FIG. 2, the access terminal 102 includes processor component 50 for performing processing functions associated with one or more of components and functions described herein. Processor component 50 can include a single or multiple set of processors or multi-core processors. Moreover, processing component 50 can be implemented as an integrated processing system and/or a distributed processing system. One skilled in the art would understand that the processor component 50 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof In one aspect, as illustrated in the example in FIG. 2, the access terminal 102 further includes a memory 52 for storing local versions of applications being executed by processor component 50. The memory 52, for example, comprises a random access memory (RAM), or a read only memory (ROM), or a combination thereof.

Further, as illustrated in the example in FIG. 2, the access terminal 102 includes a communications component 54 that provides for establishing and maintaining communications with one or more parties utilizing hardware, software, and services as described herein. Communications component 54 may carry communications between components on access terminal 102, as well as between access terminal 102 and external devices, such as devices located across a communications network and/or devices serially or locally connected to access terminal 102.

Additionally, the access terminal 102 may include a data store 56, which can be any suitable combination of hardware and/or software, that provides for mass storage of information, databases, and programs employed in connection with aspects described herein. For example, the data store 56 may be a data repository for applications not currently executing. Moreover, the access terminal 102 may include applications 62. In one example, applications are software applications.

In one aspect, the access terminal 102 may include a user interface component 58 operable to receive inputs from a user of access terminal 102, and to generate outputs for presentation to the user. User interface component 58 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user interface component 58 may include one or more output devices, including but not limited to a display, a speaker, a haptic feedback mechanism, a printer, any other mechanism capable of presenting an output to a user, or any combination thereof. In one aspect, the access terminal 102 may include a client negotiation component 104 to negotiate connectivity for the access terminal 102.

Figure 3:
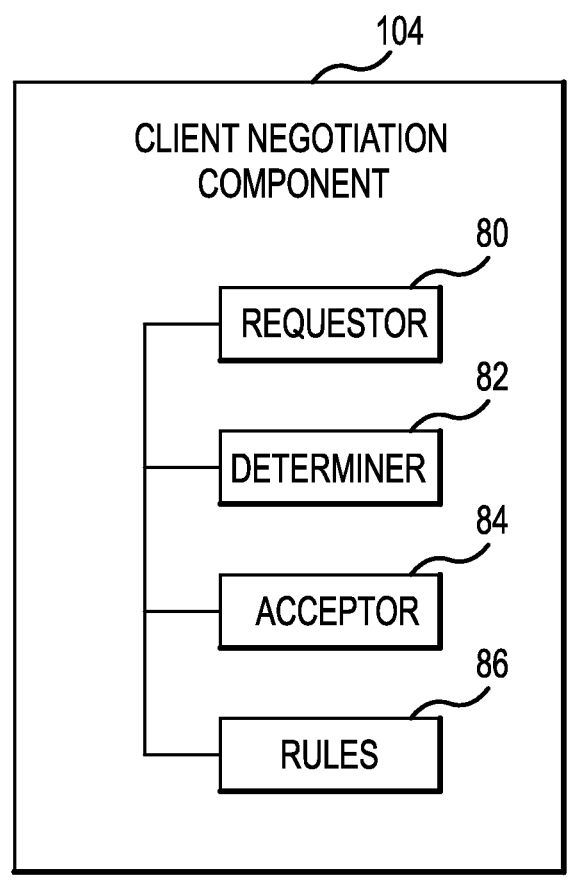
FIG. 3 illustrates an example client negotiation component in accordance with one aspect of the present disclosure.

FIG. 3 illustrates an example client negotiation component 104 in accordance with one aspect of the present disclosure. Client negotiation component 104, which can be any suitable combination of hardware and/or software, includes, for example, a requestor 80, which is operable for requesting a connection for access terminal 102. The connection request may include connectivity parameters between access terminal 102 and access network 106. In addition, client negotiation component 104 includes, for example, rules component 86, which is operable to provide rules for connecting to access network 106. For example, the rules may be pre-defined by a user of the access terminal 102.

In one aspect, the client negotiation component 104 includes a determiner 82, which is operable to determine whether the presented network connection from the access network 106 is acceptable for connection or whether the requestor 80 should request a different connection request with different connection parameters. Also, the client negotiation component 104 includes, for example, an acceptor 84 for accepting the connectivity agreement 107 agreed upon between client negotiation component 104 and network negotiation component 105.

Figure 4:
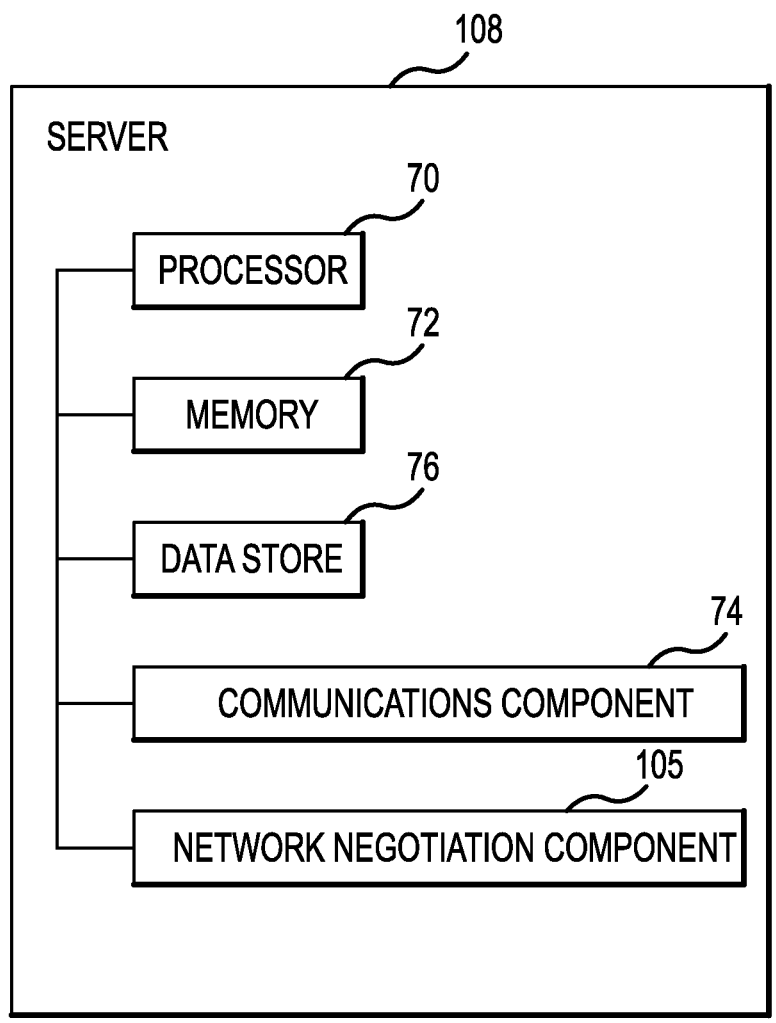
FIG. 4 illustrates an example server in accordance with one aspect of the present disclosure.

FIG. 4 illustrates an example server 108 in accordance with one aspect of the present disclosure. The server 108 manages the network connectivity matter for the access network 106. The server 108 includes, for example, a processor component 70 for carrying out processing functions associated with one or more of components and functions described herein. In one aspect, the processor component 70 comprises of a single or multiple set of processors or multi-core processors. Moreover, the processing component 70 can be implemented as an integrated processing system and/or a distributed processing system. One skilled in the art would understand that the processor component 70 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof In one example, the server 108 further includes a memory 72 for storing local versions of applications being executed by the processor component 70. For example, the memory 72 comprises a random access memory (RAM), or a read only memory (ROM) or a combination thereof Further, the server 108 includes a communications component 74 for establishing and maintaining communications with one or more parties utilizing hardware, software, and services as described herein. The communications component 74 may carry communications between components on the server 108, as well as between the server 108 and external devices, such as devices located across a communications network and/or devices serially or locally connected to the server 108.

Additionally, the server 108 may further include a data store 76, which can be any suitable combination of hardware and/or software, that provides for mass storage of information, databases, and programs employed in connection with aspects described herein. For example, the data store 76 may be a data repository for applications not currently executing. The server 108 may include a network negotiation component 105 to negotiate connection to the access network 106.

Figure 5:
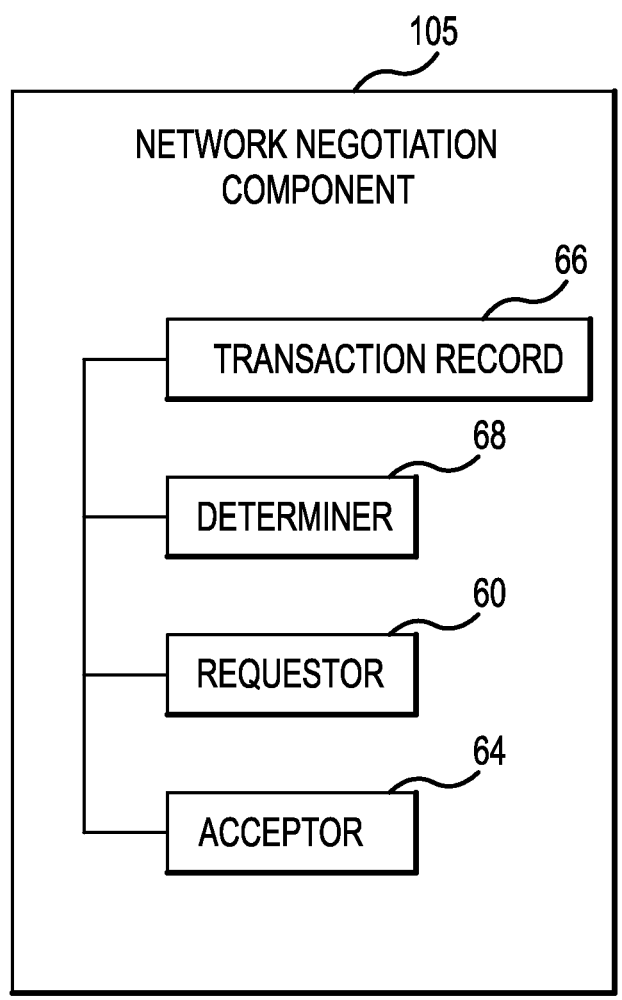
FIG. 5 illustrates an example network negotiation component 105 in accordance with one aspect of the present disclosure.

FIG. 5 illustrates an example network negotiation component 105 in accordance with one aspect of the present disclosure. The network negotiation component 105, which can be any suitable combination of hardware and/or software, includes a requestor 60 which is operable for requesting a connection with access terminal 102. In one example, the network negotiation component 105 includes a determiner 68. The determiner 68 is operable for deciding what connection is available for the access network 106 and whether the access network 106 can provide the requested connection from the client negotiation component 104, among other determinations. Moreover, the network negotiation component 105 may include a transaction record 66. The transaction record 66 identifies the current transaction occurring with the network negotiation component 105. This may be in the form of a unique identifier, a state entry, or any other form for keeping a record of the transaction. In addition, the network negotiation component 105 includes, for example, an acceptor 84 for accepting the connectivity agreement 107 agreed upon between the client negotiation component 104 and the network negotiation component 105.

Figure 6:
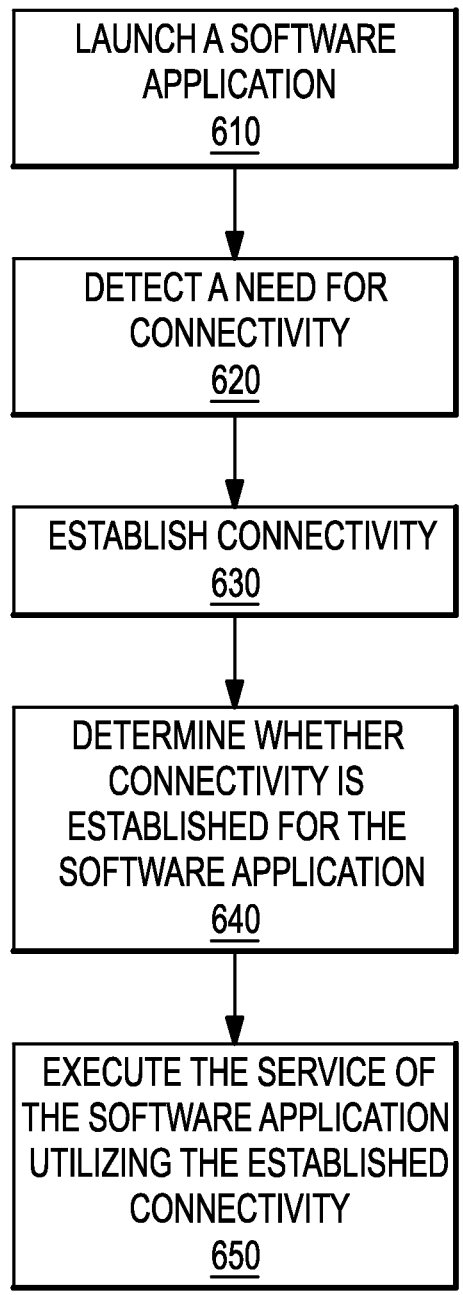
FIG. 6 illustrates an example flow diagram for bundling application services with inbuilt connectivity management.

FIG. 6 illustrates an example flow diagram for bundling application services with inbuilt connectivity management. In one example, a user device (e.g., the access terminal 102) provides an application service (e.g., VoIP or Internet browsing) and provides connectivity management. Process steps for doing so are illustrated in the example flow diagram of FIG. 6. In block 610, launch a software application. In one aspect, the software application is launched by the processor 50 to provide the application service. Following block 610, in block 620, detect a need for connectivity. In one example, the detection is done by the software application. In one example, connectivity is determined from the parameters of the launched software application. In another example, the user detects that there is a need for connectivity. For example, the user may know that the device being used only has connectivity at a particular location, and outside that location, connectivity is needed for that device. Or, the user may know that the device being used has no connectivity unless connectivity is purchased.

Following block 620, in block 630, establish connectivity. In one example, the software application executes the inbuilt connectivity management to take steps to establish the required connectivity. In one example, the step of establishing the required connectivity uses at least one parameter associated with the software application. In another example, the communication component 54 establishes connectivity per directions from the software application. In one aspect, the step in block 630 for establishing connectivity may be implemented several alternate ways. In one example, the inbuilt connectivity management comprises information necessary for connectivity establishment and ability for providing the information to an entity within the user device which executes the connectivity establishment signaling via the connectivity network, or comprises information to an entity within a user device to execute a connectivity establishment signal via a connectivity network.

In one example, information is provided through an application programming interface (API) between the software application and an entity within the user device responsible for establishing connectivity. In another aspect, the inbuilt connectivity management comprises information which identifies a connectivity agent that negotiates on behalf of the software application. The connectivity agent may be reachable via the connectivity network and may be identified by, for example, its fully qualified domain name (FQDN), service address, or Internet protocol (IP) address. In one aspect, the connectivity agent may be situated anywhere within the wireless communication system 100 (shown in FIG. 1). In another aspect, the connectivity agent resides or is associated with the service provider 112 (shown in FIG. 1).

In another aspect, the inbuilt connectivity management comprises information (a.k.a. specific information) to be passed to the connectivity agent. The information (a.k.a. specific information) may be application and/or connectivity agent specific and may be protected between the application and the connectivity agent. In another aspect, the inbuilt connectivity management comprises information about the characteristics of the required connectivity. In one example, the characteristics may be connectivity negotiation instructions. In another aspect, the inbuilt connectivity management comprises information for negotiating the required connectivity with the connectivity network, information for paying the negotiated connectivity to the connectivity network, or information for requesting a payment agent to pay the negotiated connectivity to the connectivity network.

In another aspect, the inbuilt connectivity management comprises information regarding payment methods. For example, a payment method may be a token accepted by a connectivity network selling chunks of connectivity, identity of a payment agent, information to be delivered to the payment agent to pay the connectivity network on behalf of the software application, payment executed via a payment agent, a credit card number or a pre-established credit or debit amount, etc.

In one example, connectivity is purchased (or sold) in chunks (i.e., connectivity chucks) according to the needs of the user. In one example, the connectivity chunk is defined in terms of allowed data volume. In another example, the connectivity chunk is defined in terms of allowed connectivity time. In one example, the price of the connectivity chunk is based on characteristics (e.g., such as but not limited to, data rate, error rate, availability, etc.) of the connectivity chunk. Also, for example, a connectivity chunk available for purchase may be measured in Megabytes per minute (i.e., MB/min). A buyer is free to purchase an amount of connectivity at a time and use it for establishing the current application service and/or for use at a later time for establishing additional application services. In one example, the price of the connectivity chunks is based on characteristics of the associated connectivity. The associated connectivity may be defined, for example, in terms of the relative priority, quality of service (QoS) or other specific connectivity treatment. In one aspect, the connectivity chunk is associated with specific connectivity wherein the specific connectivity could be defined in terms of allowed connectivity peers.

Following block 630, in block 640, determine whether connectivity is established for the software application. If connectivity is not established, return to block 630. If connectivity is established, proceed to block 650. In one example, the connectivity is established through the communications component 54. Additionally, the communications component 54, in one example, determines whether connectivity is established. In block 650, execute the service associated with the software application utilizing the established connectivity. In one example, the software application resides in the applications module 62 and is executed using the processor 50, the memory 52, and/or the data store 56.

In one aspect, a connectivity server provides connectivity service by the connectivity network wherein the connectivity service is available for purchase in connectivity chunks. In one aspect, a connectivity agent purchases the connectivity service for a user equipment. For example, the connectivity chunks can be defined in terms of allowed data volume or allowed connectivity time. In one example, the price of the connectivity chunks is based on characteristics (e.g., data rate, error rate, availability, etc.) of the connectivity chunks. The connectivity service expires when the purchased connectivity chunks are consumed. However, the connectivity server may inform the connectivity agent about the expiration of the connectivity service, and the connectivity agent may extend the connectivity service by purchasing additional connectivity chunks. In one example, the connectivity agent may send to the connectivity server a query regarding the characteristics (e.g., pricing information) of the connectivity chunks that are available for purchase.

One skilled in the art would understand that the steps disclosed in the example flow diagram in FIG. 6 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 7:
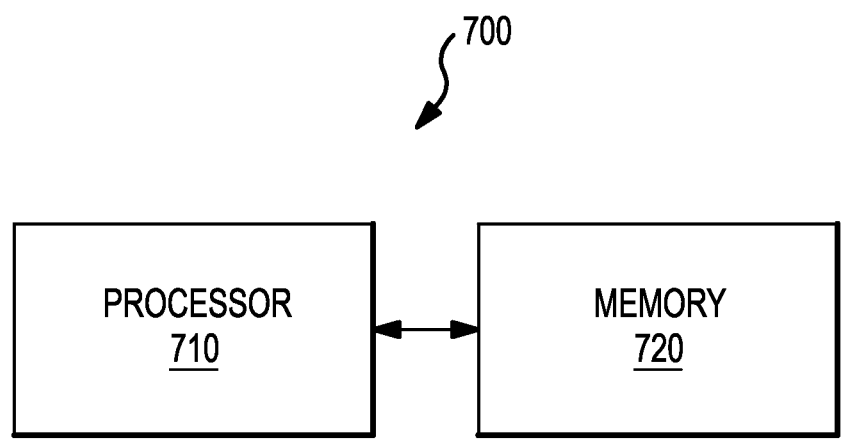
FIG. 7 illustrates an example of a device comprising a processor in communication with a memory for executing the processes for bundling application services with inbuilt connectivity management.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 7 illustrates an example of a device 700 comprising a processor 710 in communication with a memory 720 for executing the processes for bundling application services with inbuilt connectivity management. In one example, the device 700 is used to implement the algorithm illustrated in FIG. 6. In one aspect, the memory 720 is located within the processor 710. In another aspect, the memory 720 is external to the processor 710. In one aspect, the processor includes circuitry for implementing or performing the various flow diagrams, logical blocks and/or modules described herein.

Figure 8:
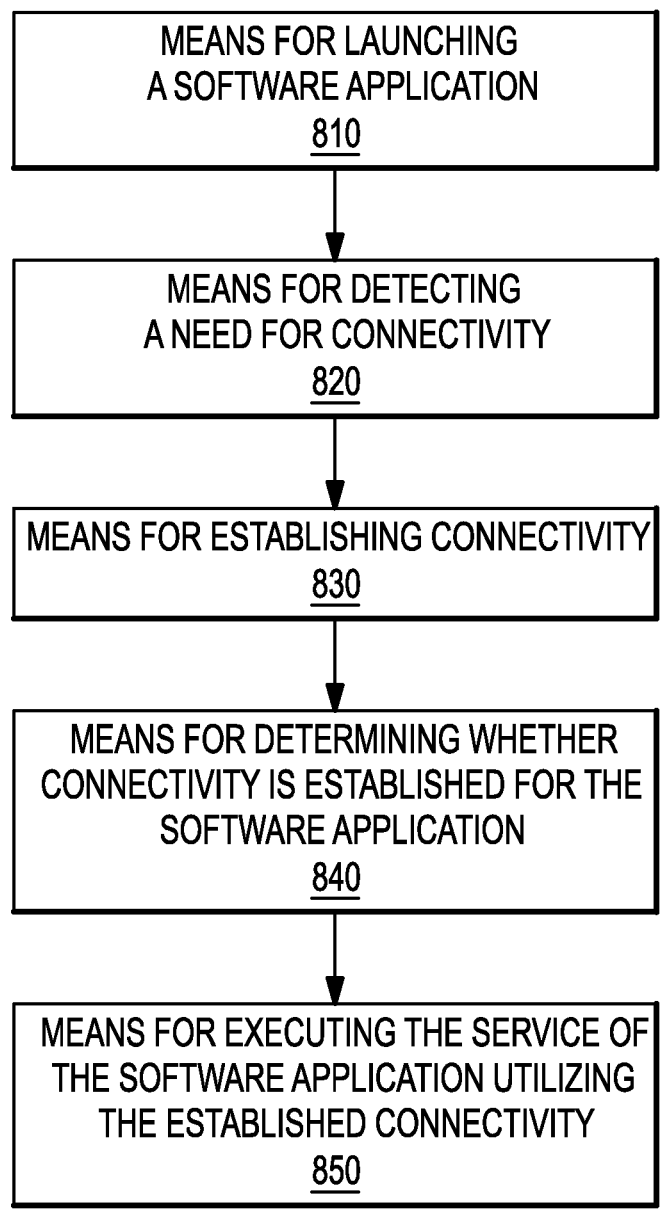
FIG. 8 illustrates an example of a device suitable for bundling application services with inbuilt connectivity management.

FIG. 8 illustrates an example of a device 800 suitable for bundling application services with inbuilt connectivity management. In one aspect, the device 800 is implemented by at least one processor comprising one or more modules configured to provide different aspects of bundling application services with inbuilt connectivity management as described herein in blocks 810, 820, 830, 840 and 850. For example, each module comprises hardware, firmware, software, or any combination thereof. In one aspect, the device 800 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for bundling application services with inbuilt connectivity management comprising:
    launching, at an access terminal, a software application comprising an application service associated with an application service provider;
    detecting, via the software application, a need for connectivity with a connectivity network to use the application service associated with the software application;
    establishing connectivity via a processor using an inbuilt connectivity management of the software application, wherein the inbuilt connectivity management comprises information necessary to establish the connectivity, wherein the information identifies a connectivity agent associated with the application service provider that negotiates connectivity on behalf of the software application, wherein the connectivity agent negotiates a connectivity agreement with the connectivity network including at least one parameter for connectivity, wherein the connectivity agent is located across the connectivity network from the access terminal; and
    executing the application service associated with the software application utilizing the established connectivity.

2. The method of claim 1 further comprising determining whether connectivity is established.

3. The method of claim 1 wherein the at least one parameter for connectivity includes a cost of the connectivity.

4. The method of claim 1, wherein the connectivity agent is reachable via the connectivity network and is identified by one of the following: a fully qualified domain name (FQDN), a service address, or an Internet protocol (IP) address.

5. The method of claim 1 wherein the information comprises connectivity negotiation instructions and the connectivity agent negotiates connectivity on behalf of the software application using the connectivity negotiation instructions.

6. The method of claim 1 wherein the inbuilt connectivity management further comprises information provided to an entity within a user device to execute a connectivity establishment signal via the connectivity network.

7. The method of claim 6 wherein the information is provided through an application programming interface (API) between the software application and the entity.

8. The method of claim 6 wherein the information comprises connectivity negotiation instructions.

9. The method of claim 6 wherein the inbuilt connectivity management further comprises specific information to be passed to the connectivity agent wherein the specific information pertains either to the software application or to the connectivity agent.

10. The method of claim 1 wherein connectivity is available for purchase in connectivity chunks.

11. The method of claim 10 wherein the connectivity chunks are defined in terms of allowed data volume.

12. The method of claim 10 wherein the connectivity chunks are defined in terms of allowed connectivity time.

13. The method of claim 10 wherein the price of the connectivity chunks is based on characteristics of the connectivity chunks.

14. The method of claim 10 wherein the connectivity agent comprises information regarding a payment method for purchasing the connectivity chunks.

15. The method of claim 10 wherein at least one connectivity chunk of the connectivity chunks is used for executing the service associated with the software application.

16. The method of claim 10 wherein the inbuilt connectivity management comprises information regarding a payment method.

17. The method of claim 16 wherein the payment method is one of the following: a token accepted by the connectivity network selling chunks of connectivity, identity of a payment agent, information to be delivered to the payment agent to pay the connectivity network on behalf of the software application, payment executed via a payment agent, a credit card number or a pre-established credit or debit amount.

18. The method of claim 1, wherein the application service associated with the software application is different from the connectivity to a network.

19. An access terminal for bundling application services with inbuilt connectivity management comprising:
    a software application for detecting a need for connectivity with a connectivity network to use an application service associated with the software application and with an application service provider;
    a processor for launching the software application;
    a communications component for establishing connectivity per directions from an inbuilt connectivity management of the software application, wherein the inbuilt connectivity management comprises information necessary to establish the connectivity, wherein the information identifies a connectivity agent associated with the application service provider that negotiates connectivity on behalf of the software application, wherein the connectivity agent negotiates a connectivity agreement with the connectivity network including at least one parameter for connectivity, wherein the connectivity agent is located across the connectivity network from the access terminal; and
    wherein the processor executes the application service associated with the software application utilizing the established connectivity.

20. The access terminal of claim 19 wherein the communications component further determines whether connectivity is established.

21. The access terminal of claim 19 wherein the at least one parameter for connectivity includes a cost of the connectivity.

22. The access terminal of claim 19 wherein the connectivity agent is reachable via the connectivity network and is identified by one of the following: a fully qualified domain name (FQDN), a service address, or an Internet protocol (IP) address.

23. The access terminal of claim 19 wherein the information comprises connectivity negotiation instructions and the connectivity agent negotiates connectivity on behalf of the software application using the connectivity negotiation instructions.

24. The access terminal of claim 19 wherein the inbuilt connectivity management further comprises information provided to an entity within a user device to execute a connectivity establishment signal via the connectivity network.

25. The access terminal of claim 24 wherein the information is provided through an application programming interface (API) between the software application and the entity.

26. The access terminal of claim 24 wherein the information comprises connectivity negotiation instructions.

27. The access terminal of claim 24 wherein the inbuilt connectivity management further comprises specific information to be passed to the connectivity agent wherein the specific information pertains either to the software application or to the connectivity agent.

28. The access terminal of claim 19 wherein connectivity is available for purchase in connectivity chunks.

29. The access terminal of claim 28 wherein the connectivity chunks are defined in terms of allowed data volume.

30. The access terminal of claim 28 wherein the connectivity chunks are defined in terms of allowed connectivity time.

31. The access terminal of claim 28 wherein the price of the connectivity chunks is based on characteristics of the connectivity chunks.

32. The access terminal of claim 28 wherein the connectivity agent comprises information regarding a payment method for purchasing the connectivity chunks.

33. The access terminal of claim 28 wherein at least one connectivity chunk of the connectivity chunks is used for executing the service associated with the software application.

34. The access terminal of claim 28 wherein the inbuilt connectivity management comprises information regarding a payment method.

35. The access terminal of claim 24 wherein the payment method is one of the following: a token accepted by the connectivity network selling chunks of connectivity, identity of a payment agent, information to be delivered to the payment agent to pay the connectivity network on behalf of the software application, payment executed via a payment agent, a credit card number or a pre-established credit or debit amount.

36. An apparatus for bundling application services with inbuilt connectivity management comprising:
    means for launching, at an access terminal, a software application comprising an application service associated with an application service provider;
    means for detecting, via the software application, a need for connectivity with a connectivity network to use the application service associated with the software application;
    means for establishing connectivity using an inbuilt connectivity management of the software application, wherein the inbuilt connectivity management comprises information necessary to establish connectivity, wherein the information identifies a connectivity agent associated with the application service provider that negotiates connectivity on behalf of the software application, wherein the connectivity agent negotiates a connectivity agreement with the connectivity network including at least one parameter for connectivity, wherein the connectivity agent is located across the connectivity network from the access terminal; and
    means for executing the application service associated with the software application utilizing the established connectivity.

37. The apparatus of claim 36 further comprising means for determining whether connectivity is established.

38. The apparatus of claim 36 wherein the at least one parameter for connectivity includes a cost of the connectivity.

39. The apparatus of claim 36 wherein the connectivity agent is reachable via the connectivity network and is identified by one of the following: a fully qualified domain name (FQDN), a service address, or an Internet protocol (IP) address.

40. The apparatus of claim 36 wherein the information comprises connectivity negotiation instructions and the connectivity agent negotiates connectivity on behalf of the software application using the connectivity negotiation instructions.

41. The apparatus of claim 36 wherein the inbuilt connectivity management further comprises information provided to an entity within a user device to execute a connectivity establishment signal via the connectivity network.

42. The apparatus of claim 41 wherein the information is provided through an application programming interface (API) between the software application and the entity.

43. The apparatus of claim 41 wherein the information comprises connectivity negotiation instructions.

44. The apparatus of claim 41 wherein the inbuilt connectivity management further comprises specific information to be passed to the connectivity agent wherein the specific information pertains either to the software application or to the connectivity agent.

45. The apparatus of claim 36 wherein connectivity is available for purchase in connectivity chunks.

46. The apparatus of claim 45 wherein the connectivity chunks are defined in terms of allowed data volume.

47. The apparatus of claim 45 wherein the connectivity chunks are defined in terms of allowed connectivity time.

48. The apparatus of claim 45 wherein the price of the connectivity chunks is based on characteristics of the connectivity chunks.

49. The apparatus of claim 45 wherein the connectivity agent comprises information regarding a payment method for purchasing the connectivity chunks.

50. The apparatus of claim 45 wherein at least one connectivity chunk of the connectivity chunks is used for executing the service associated with the software application.

51. The apparatus of claim 45 wherein the inbuilt connectivity management comprises information regarding a payment method.

52. The apparatus of claim 51 wherein the payment method is one of the following: a token accepted by the connectivity network selling chunks of connectivity, identity of a payment agent, information to be delivered to the payment agent to pay the connectivity network on behalf of the software application, payment executed via a payment agent, a credit card number or a pre-established credit or debit amount.

53. A non-transitory computer-readable medium storing computer executable code, comprising code for:
    launching, at an access terminal, a software application comprising an application service associated with an application service provider;
    detecting, via the software application, a need for connectivity with a connectivity network to use the application service associated with the software application;
    establishing connectivity using an inbuilt connectivity management of the software application, wherein the inbuilt connectivity management comprises information necessary to establish connectivity, wherein the information identifies a connectivity agent associated with the application service provider that negotiates connectivity on behalf of the software application, wherein the connectivity agent negotiates a connectivity agreement with the connectivity network including at least one parameter for connectivity, wherein the connectivity agent is located across the connectivity network from the access terminal; and executing the application service associated with the software application utilizing the established connectivity.

54. The non-transitory computer-readable medium of claim 53 wherein execution of the computer program is also for determining whether connectivity is established.

55. The non-transitory computer-readable medium of claim 53 wherein at least one parameter for connectivity includes a cost of the connectivity.

56. The non-transitory computer-readable medium of claim 53 wherein the connectivity agent is reachable via the connectivity network and is identified by one of the following: a fully qualified domain name (FQDN), a service address, or an Internet protocol (IP) address.

57. The non-transitory computer-readable medium of claim 53 wherein the information comprises connectivity negotiation instructions and the connectivity agent negotiates connectivity on behalf of the software application using the connectivity negotiation instructions.

58. The non-transitory computer-readable medium of claim 53 wherein the inbuilt connectivity management further comprises information provided to an entity within a user device to execute a connectivity establishment signal via the connectivity network.

59. The non-transitory computer-readable medium of claim 58 wherein the information is provided through an application programming interface (API) between the software application and the entity.

60. The non-transitory computer-readable medium of claim 58 wherein the information comprises connectivity negotiation instructions.

61. The non-transitory computer-readable medium of claim 58 wherein the inbuilt connectivity management further comprises specific information to be passed to the connectivity agent wherein the specific information pertains either to the software application or to the connectivity agent.

62. The non-transitory computer-readable medium of claim 53 wherein connectivity is available for purchase in connectivity chunks.

63. The non-transitory computer-readable medium of claim 62 wherein the connectivity chunks are defined in terms of allowed data volume.

64. The non-transitory computer-readable medium of claim 62 wherein the connectivity chunks are defined in terms of allowed connectivity time.

65. The non-transitory computer-readable medium of claim 62 wherein the price of the connectivity chunks is based on characteristics of the connectivity chunks.

66. The non-transitory computer-readable medium of claim 62 wherein the connectivity agent comprises information regarding a payment method for purchasing the connectivity chunks.

67. The non-transitory computer-readable medium of claim 62 wherein at least one connectivity chunk of the connectivity chunks is used for executing the service associated with the software application.

68. The non-transitory computer-readable medium of claim 62 wherein the inbuilt connectivity management comprises information regarding a payment method.

69. The non-transitory computer-readable medium of claim 68 wherein the payment method is one of the following: a token accepted by the connectivity network selling chunks of connectivity, identity of a payment agent, information to be delivered to the payment agent to pay the connectivity network on behalf of the software application, payment executed via a payment agent, a credit card number or a pre-established credit or debit amount.

70. At least one processor configured to bundle application services with inbuilt connectivity management comprising:
a first module for launching, at an access terminal, a software application comprising an application service associated with an application service provider;
a second module for detecting, via the software application, a need for connectivity with a connectivity network to use the application service associated with the software application;
a third module for establishing connectivity using an inbuilt connectivity management of the software application, wherein the inbuilt connectivity management comprises information necessary to establish the connectivity, wherein the information identifies a connectivity agent associated with the application service provider that negotiates connectivity on behalf of the software application, wherein the connectivity agent negotiates a connectivity agreement with the connectivity network including at least one parameter for connectivity, wherein the connectivity agent is located across the connectivity network from the access terminal; and
a fourth module for executing the application service associated with the software application utilizing the established connectivity.

* * * * *